(12) United States Patent
Rath et al.

(10) Patent No.: US 12,026,377 B2
(45) Date of Patent: Jul. 2, 2024

(54) METHOD TO IMPLEMENT AND ENFORCE A COST-BASED QUOTA FOR CLOUD OPERATIONS IN BACKUP SERVERS BASED ON ALLOWED CLOUD BUDGET

(71) Applicant: EMC IP Holding Company LLC, Hopkinton, MA (US)

(72) Inventors: Jagannathdas Rath, Bengaluru (IN); Kalyan C Gunda, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 246 days.

(21) Appl. No.: 17/333,966

(22) Filed: May 28, 2021

(65) Prior Publication Data

US 2022/0382469 A1    Dec. 1, 2022

(51) Int. Cl.
*G06F 3/06* (2006.01)
(52) U.S. Cl.
CPC .......... *G06F 3/0631* (2013.01); *G06F 3/0608* (2013.01); *G06F 3/067* (2013.01)
(58) Field of Classification Search
CPC ....... G06F 3/0631; G06F 3/0608; G06F 3/067
See application file for complete search history.

(56) References Cited

U.S. PATENT DOCUMENTS

| | | | |
|---|---|---|---|
| 9,811,390 B1 * | 11/2017 | Ma | G06F 9/5038 |
| 10,078,583 B1 * | 9/2018 | Wallace | G06F 11/1453 |
| 2003/0177176 A1 * | 9/2003 | Hirschfeld | G06F 9/5077 709/203 |
| 2015/0248544 A1 * | 9/2015 | Fadida | H04L 63/102 726/4 |
| 2016/0011904 A1 * | 1/2016 | Kumaresan | G06F 9/485 718/102 |
| 2017/0251050 A1 * | 8/2017 | Masson | H04L 67/1097 |
| 2019/0139185 A1 * | 5/2019 | Baggerman | G06T 1/20 |
| 2020/0029110 A1 * | 1/2020 | Xin | H04L 67/1012 |

* cited by examiner

*Primary Examiner* — Eric T Loonan
(74) *Attorney, Agent, or Firm* — WOMBLE BOND DICKINSON (US) LLP (57) ABSTRACT

A method, apparatus, and system for managing backup resource on a cloud for a plurality of backup servers is disclosed. A resource configuration for each cloud storage is received. The resource configuration includes allocated cloud resource amount and duration. Cloud operation utilization is calculated for each cloud storage. The cloud operation utilization is compared with the resource configuration to determine a total cloud operation utilization for each cloud storage. A plurality of rules is applied in view of the total cloud operation utilization to determine a plurality of cloud storage operational states. The cloud storage is configured to be in one of the plurality of cloud storage operational states based on the plurality of rules to limit an amount of data to be transmitted to and stored in the cloud storage within a predetermined period of time.

20 Claims, 7 Drawing Sheets

METHOD TO IMPLEMENT AND ENFORCE A COST-BASED QUOTA FOR CLOUD OPERATIONS IN BACKUP SERVERS BASED ON ALLOWED CLOUD BUDGET

FIELD OF THE INVENTION

Embodiments of the present invention relate generally to backup applications. More particularly, embodiments of the invention relate to a method for a cost-based quota for cloud operations in backup servers based on allowed cloud budget.

BACKGROUND

As cloud technology is becoming more accessible, cloud storage ("cloud tier") has become a common practice for direct backup applications, deduplication (dedupe) and non-deduplication (non-dedupe), to store data off-premise for long term retention purposes. In a dedupe backup system, a file is split into segments and these segments are deduped across all files in the system. These unique segments are packed into containers and then loaded to a cloud as objects varying around few Megabytes (MBs) in size. Whereas, in non-dedupe backup systems, the files may be directly moved as a whole unit of data to a cloud or split into multiple objects/chunks and then moved to the cloud. The movement of these data to the cloud is generally governed by various policies that can be configured in the backup servers. For example, Data Domain (DD) allows setting policies, including "move all files older than two weeks to cloud."

Organizations with multiple backup servers deployed on-premise often have a limit on the allowable budget for cloud operations. The total budget is allocated for all of the backup servers or per department/unit/group having a number of backup servers. Cloud operations in the backup server may need to be suspended if the billing amount exceeds the allowable cloud budget. The cloud operations may remain suspended until the new budget becomes available. The administrator often manages the cloud budgeting manually such as adjusting the schedules based on the billing cost every month. The administrator also has to perform additional work when the cloud budget is allocated for multiple backup servers. Thus, there is a need for systems and methods for a backup server to determine the allowed cloud budget and to control the cloud operations based on the allocated budget.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to a method, apparatus, and system for managing backup resource on a cloud for a plurality of backup servers. According to some embodiments, backup server receives a resource configuration for each cloud storage. The resource configuration may include allocated cloud resource amount and duration. Backup server calculates cloud operation utilization for each cloud storage. Backup server compares the cloud operation utilization with the resource configuration to determine a total cloud operation utilization for each cloud storage. Backup server applies a plurality of rules in view of the total cloud operation utilization to determine a plurality of cloud storage operational states. Backup server configures the cloud storage to be in one of the plurality of cloud storage operational states based on the plurality of rules to limit an amount of data to be transmitted to and stored in the cloud storage within a predetermined period of time.

In one embodiment, backup server fetches cloud operation usage data representing statistics of each cloud operation performed in the backup server for a plurality of cloud hierarchy levels. Backup server fetches resource data and cloud storage classes for each of the cloud storage. Backup server calculates the cloud operation utilization in view of the cloud operation usage data, resource data, and cloud storage classes. Backup server records the cloud operation utilization for the plurality cloud hierarchy levels in a local storage.

In a particular embodiment, applying the plurality of rules includes generating a first alert indicative of the cloud resource is going to be exhausted when the total consumption is within a predetermined percent of the configured resource.

In one embodiment, applying the plurality of rules includes performing one or more processes, including a garbage collection (GC) process. Applying the plurality of rules may further include transitioning from a first cloud operational state to a second cloud operation state when the total consumption is more than a predetermined percent of the configured resource. The second cloud operation state indicates the cloud storage is going to be suspended. Applying the plurality of rules also includes generating a second alert indicative of the cloud resource is almost exhausted.

In one embodiment, backup server configures metadata to represent the plurality of cloud storage operational states for each configured cloud storage provider. The plurality of cloud storage operational states include working state, to-be-suspended state, and suspended state.

In one embodiment, the cloud storage remains in the suspended state until a current duration cycle completes and a next duration cycle starts. In another embodiment, the cloud storage remains in the suspended state until a cloud budget is updated for a current duration cycle.

The embodiments of the present disclosure provide a cost-based quota enforcing layer for any backup server. An administrator can specify monetary values and duration for each backup server which can be spent for cloud operations in that duration (e.g., monthly). The embodiments of the present disclosure may avoid cloud costs to go over the allocated cloud budget for the backup server. The embodiments of the present disclosure may use the cloud providers pricing application programming interfaces (APIs) and apply the APIs to the various cloud operations accumulated in the backup server to derive the approximate cost/billing amount accumulated at any point of time and then decide whether to allow new cloud operations or not. The embodiments of the present disclosure automatically suspend and resume the cloud operations as per available/remaining cloud budget for that duration. In this manner, no manual intervention of any kind is needed. The embodiments of the present disclosure also flexibly facilitate increasing/decreasing the cloud budget at any time. The administrator can reduce budget from one backup server and add it to another server. The embodiments of the present disclosure account for all types of cloud operations and not just reads and writes, so the cost/billing amount calculated will be close to the one generated at the end of the billing cycle by a cloud provider. The embodiments of the present disclosure also provide a cost-trend at backup or backup type level, to pin-point on backups utilizing more cloud storage and/or resulting in more cloud expenditure overtime. Based on this insight, the administrator now can increase cloud budget or reduce frequency/amount of backups for such backup jobs/types.

In another aspect of the disclosure, embodiments of the present disclosure also provide a non-transitory machine-readable medium and a data processing system perform the processes as described above.

Figure 1:
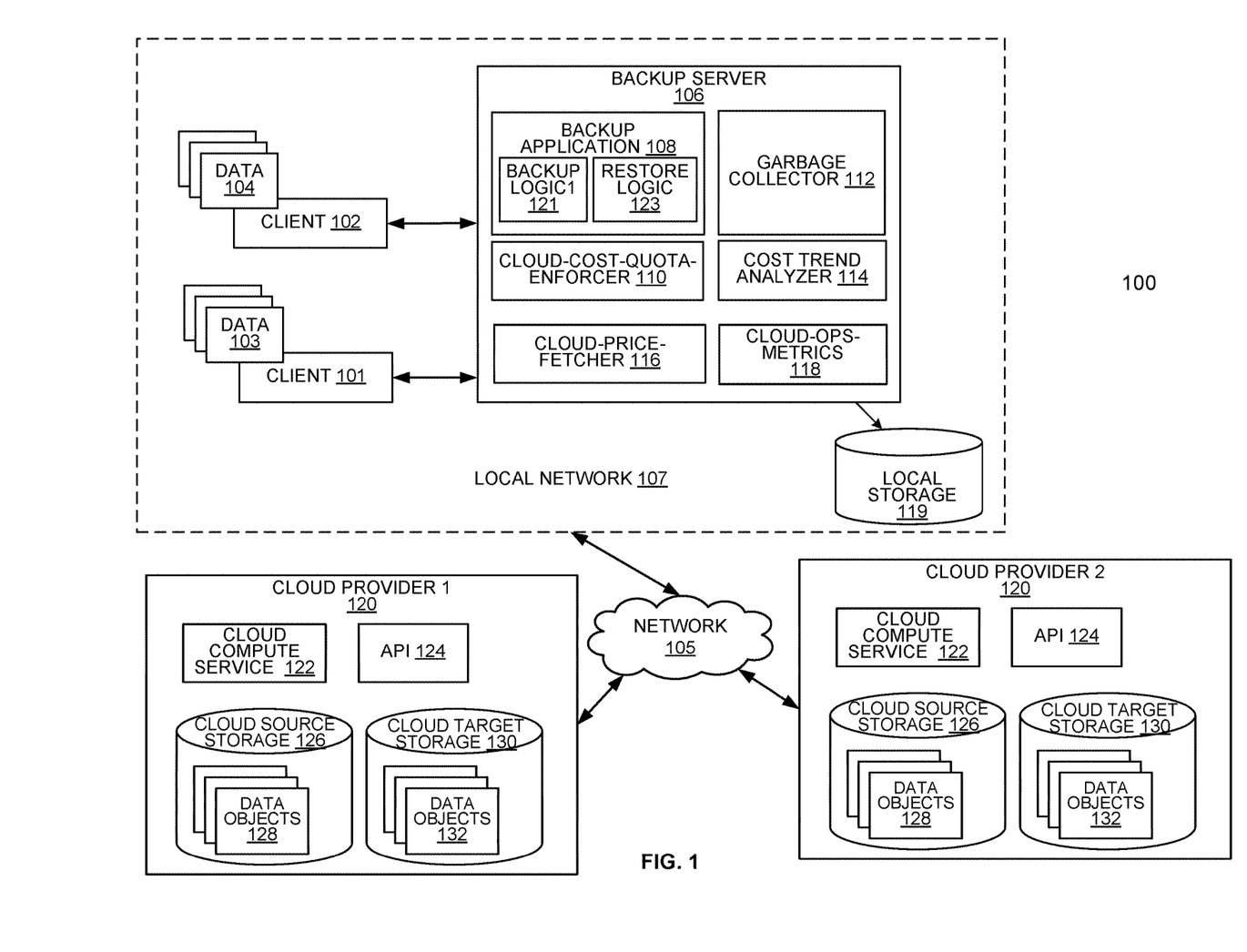
FIG. 1 is a block diagram illustrating an example environment in which embodiments of the disclosure may be practiced.

Referring to FIG. 1, a block diagram illustrating an example networked environment 100 in which embodiments of the disclosure may be practiced is shown. The networked environment 100 may include, but is not limited to, a plurality of clients 101-102, a backup server 106, a network 105, a local network 107, and a cloud provider 120. The plurality of clients 101-102 having data 103 and 104 stored therein, respectively, may be any type of client such as a host or server, a personal computer (e.g., desktops, laptops, and tablets), a "thin" client, a personal digital assistant (PDA), a Web enabled appliance, or a mobile phone (e.g., Smartphone), etc. Alternatively, any of the plurality of clients 101-102 may be a primary storage system (e.g., local data center) that provides storage to other local clients, which may periodically back up the content stored therein to a backup storage system (e.g., a disaster recovery site or system), such as a local storage 119. Local network 107 and network 105 may be any type of networks such as a local area network (LAN), a wide area network (WAN) such as the Internet, a fiber network, a storage network, or a combination thereof, wired or wireless. The plurality of clients 101-102 may be in physical proximity or may be physically remote from one another. The local storage 119 may be located in proximity to one, both, or neither of clients 101-102. Therefore, the client 101-102 may be a backup client of the backup server 106. Client 101-102, backup server 106, and local storage 119 may be communicatively connected to one another via the local network 107. Client 101-102, backup server 106, and local storage 119 may be communicatively connected to the cloud provider via the network 105.

The backup server 106 may include backup application 108, cloud-cost-quota-enforcer 110, garbage collector 112, cost trend analyzer 114, cloud-price-fetcher 116, and cloud-ops-metrics 118. The backup server 106 utilizes one or more cloud storages to move data regularly for long term retention. The backup server 106 performs a variety of cloud operations, for example, moving new data to the cloud, reading existing cloud data, performing garbage collection-based cleanups, deleting cloud data, obtaining objects metadata only, listing objects, performing batch jobs, etc.

In one embodiment, backup application 108 may be separate from the backup server 106. For example, backup application 108 may include backup logic 121 and restore logic 123. Backup logic 121 is configured to receive and back up data from a client (e.g., clients 101-102) and to store the backup data in the local storage 119. Restore logic 123 is configured to retrieve and restore backup data from the local storage 119 back to a client (e.g., clients 101-102). The backup server 106 may back up data stored on the local storage 119. The local storage 119 may be a part of the backup server 106 or separate from the backup server 106. The backup server 106 may initiate backup operations in response to requests from the clients 101-102. The backup application 108 can also be an independent system outside of the backup server 106 and can coordinate a backup operation between clients 101 and 102 and the backup server 106. In one embodiment, a client 102, for example, may transmit a request for a backup process for data 104 (e.g., a set of files) to the backup application 108. After receiving the request from the client 102, the backup application 108 may initiate a backup operation of data 104 and the data 104 is copied to the local storage 119 from the client 102. The backup server 106, may then initiate data movement of the data stored in the local storage 119 to the cloud source storage 126 based on various defined data movement policies.

The local storage 119 may be implemented locally (e.g., single node operating environment) or remotely (e.g., multi-node operating environment) via interconnect (not shown), which may be a bus and/or a network (e.g., a storage network or a network similar to local network 107). The local storage 119 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. The local storage 119 may be located locally or be remotely accessible over a network. According to one embodiment, the garbage collector 112 may be configured to perform garbage collection (GC) process.

The cloud provider 120 may include cloud compute service 122, API 124, cloud source storage 126 storing data objects 128, and cloud target storage 130 storing data objects 132. Although two cloud providers 120 are shown, more than two cloud providers can be supported in this network environment 100. The cloud source storage 126 may represent a primary cloud storage region and the target storage may represent a secondary cloud storage region. Data objects 132 stored in the cloud target storage 130 may represent replicated data of the data objects 128 stored in the cloud source storage 126. It can be appreciated that data objects 132 may represent any type of data stored in the cloud storage 126. Backup application initially writes data to the cloud source storage 126. The cloud provider may replicate the data objects 128 stored in the cloud source storage 126 to the target storage 130. In one embodiment, for example, the cloud provider 120 can be deployed in a cloud environment as a server of a cloud service provider. The cloud provider 120 provides cloud services over a network that is open for public use, such as the Internet. The cloud provider 120 may be a public cloud service provider such as Amazon Web Services® (AWS), Microsoft Azure®), IBM Cloud, or Google Cloud Platform. In another embodiment, the cloud provider 120 may be a private cloud that is located at a client's premise. In some embodiments, various operations of the cloud source storage 126 and the cloud target storage 130 on the cloud provider 120 may be managed by a cloud compute service 122. The cloud source storage 126 and the cloud target storage 130 may be hosted on one or more data centers including any number of storage devices as will be appreciated by one ordinarily skilled in the art. The cloud source storage 126 and the cloud target storage 130 may be geographically spread out over several physical locations. The cloud provider 120 may include or represent any type of servers or a cluster of one or more servers (e.g., cloud servers). For example, cloud provider 120 may be a storage server used for various different purposes, such as to provide multiple users or client systems with access to shared data and/or to back up (or restore) data (e.g., mission critical data). The cloud provider 120 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fiber channel (FC) protocol, etc. The cloud provider 120 may further provide storage services via an object-based protocol like S3, Hadoop distributed file system (HDFS) protocol, or the likes.

In one embodiment, cloud compute service 122 (also referred to as service logic, service module, or service unit), may be implemented in software, hardware, or a combination thereof. Cloud compute service 122 may also represent any storage service related components configured or adapted to provide storage services (e.g., storage as a service) to a variety of clients using any of the access protocols set forth above.

The cloud compute service 122 of the cloud provider 120 may receive the request for data movement process from the backup server 106. During the backup operations, the backup server 106 may retrieve data that is to be backed up from the local storage 116 and may transfer the data to the cloud source storage 126 in the cloud provider 120 for backup storage on the cloud.

The cloud provider 120 may include public cloud providers such as Amazon Web Services® (AWS), Microsoft Azure®), IBM Cloud, or Google Cloud Platform (GCP). These cloud providers may provide S3 storage under a variety of classes. The classes may include Geographical Region based (e.g. US-East-1, US-West-1, AP-East-1 etc.). The classes may also include storage class/tiers based on access times, cost, and minimum storage durations. For example, storage class/tiers may be divided into (i) standard/ hot tier for more frequently accessed data; (ii) cold tier for less frequently accessed data; (iii) archive tier for almost not accessed data for many months or year; and (iv) deep archive tier for not accessed data for years.

The classes may also include intelligent tiers. These tiers, for example, AWS Intelligent Tier that can move data automatically to the next less costly/slow access tier if data are not accessed for certain number of days, e.g., 30 days, 90 days, 180 days, etc. However, these tiers generally require monthly monitoring and auto-tiering costs. These tiers must wait for the waiting period of each next tier in order to move data to the last archival tier. All these tiers come with their own costs and minimum billing durations.

It should be appreciated that the clients 101-102, the backup server 106, and the cloud provider 120 may have access to the network 105 (e.g., a public network), through which they may communicate with each other. Therefore, under the coordination of the backup server 106, the data from the clients 101-102 may be backed up by the backup application 108 in the local storage 119. Then, according to a predefined policy, the backup server 106 may move the data from the local storage 119 to the cloud source storage 126.

Figure 2:
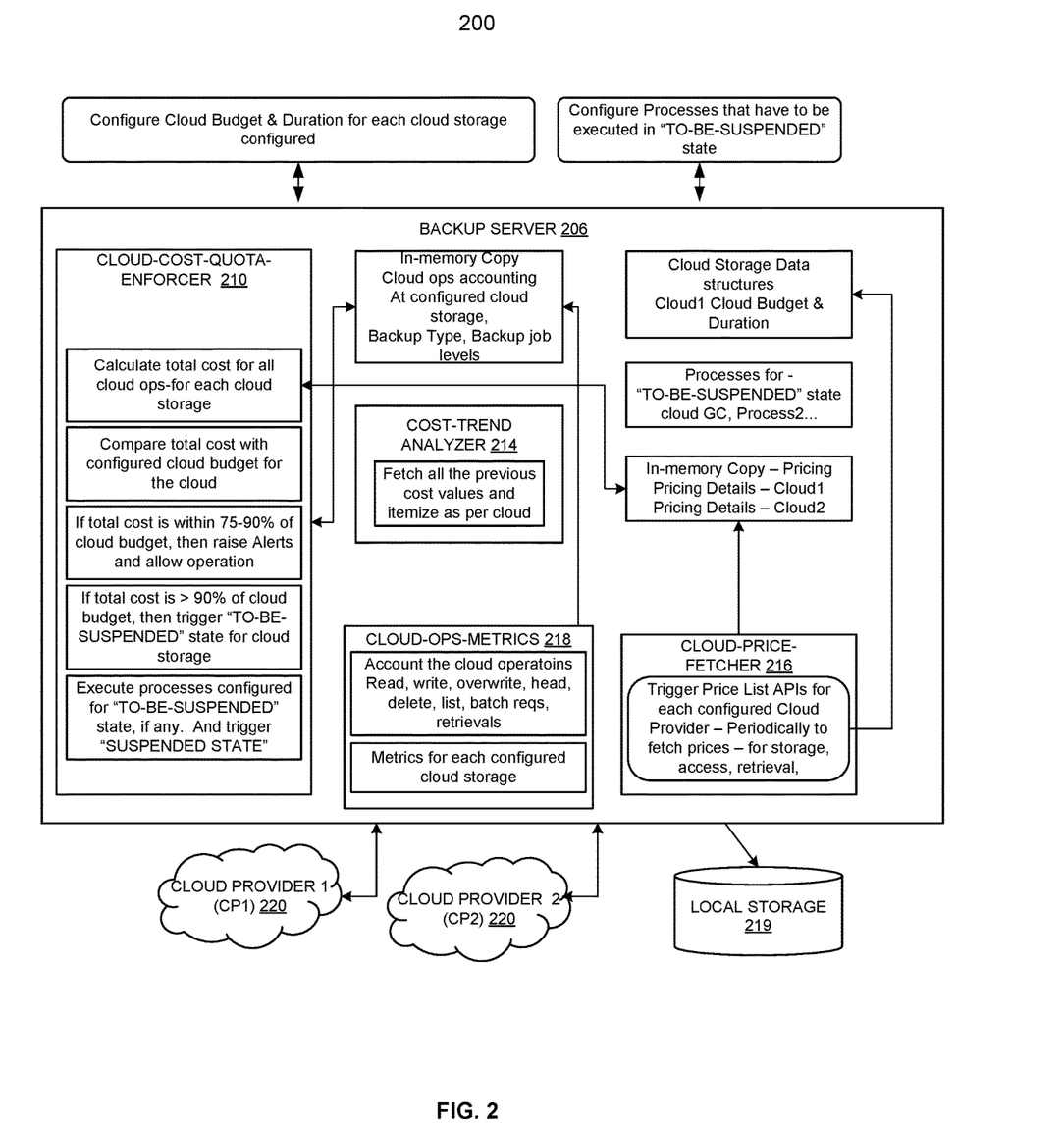
FIG. 2 is a block diagram depicting an example of a backup server according to one embodiment.

FIG. 2 is an example of a backup server 206 representing the backup server 106 (see FIG. 1) according to one embodiment. The backup server 206, may initiate data movement of the data stored in the local storage 219 to the cloud source storage based on various defined data movement policies. While the cloud storage is being configured, the backup server 206 may provide options to administrator to specify an allowable cloud budget value and duration for the backup server 206. For one backup server configuration, the allowable cloud budget value may equal the total allowable cloud budget. For a configuration with multiple backup servers, the allowable cloud budget value can be defined as a total allowable cloud budget divided by a total number of backup servers. For example, each backup server for a configuration with four backup servers may be allocated with 25% of the allowable cloud budget value. If the allowable cloud budget value is $1000, each backup server may be allocated with $250 for the duration. In another embodiment, the administrator can allocate certain percentage of the allowable cloud budget to each backup server based on factors including criticality, amount of data, etc. For example, backup server1, backup server2, backup server3, and backup server4 may be allocated with 20%, 40%, 25%, and 15% of the allowable cloud budget value, respectively.

The backup server may store the allowable cloud budget-duration for which the budget is applicable (e.g., 15 days, 1 month, 2 months, etc.) Both the cloud budget value and duration may be stored in-memory as well as persistent on the disk.

In one embodiment, the allowable cloud budget and the duration can be updated in two modes. In other words, the allowable cloud budget and the duration can be added or removed. The first mode is Next Cycle in which new duration may be applicable in the next cycle only. The second mode is Immediate in which the new budget may be effective immediately if specified during the update. Otherwise, the new budget may be effective in the next duration cycle. Only an unused budget can be removed (can be found after calculating accumulated cost till now for the duration). It is beneficial to move the available cloud budget from one backup server to other backup servers or when an additional cloud budget is granted.

In one embodiment, the backup server 206 may configure metadata to represent the plurality of cloud storage operational states for each configured cloud storage provider. The plurality of cloud storage operational states include working state, to-be-suspended state, and suspended state. The backup server 206 may add a new state metadata for each configured cloud storage provider i.e. "operational-state", in the backup server. The three operational states include "WORKING" in which the default state of the cloud storage in the server. The operational states may also include "TO-BE-SUSPENDED" in which specific modules of the server would be able to trigger the cloud storage to go to the "TO-BE-SUSPENDED" state when the allowable budget is used up. No cloud operations would be allowed in this state. Processes like Cloud GC can be allowed (configurable) to execute as soon as this state is triggered to free up cleanable data and reduce overall billing. Once Cloud GC or other processes are configured to complete execution, or even if none are configured, the method will trigger the cloud storage to go to the "SUSPENDED" state. The operational states may further include "SUSPENDED" in which no cloud operations are allowed in this state.

Different modules or processes of the backup server such as data movement module, data read module, garbage collectors, and tier movers may check the operational state and execute operations only when the operational state is in "WORKING" state. Each configured cloud storage provider may have this operational state separately.

Backup server 206 may include cloud-cost-quota-enforcer 210. Cloud-cost-quota-enforcer 210 may calculate total cost for all cloud operations for each cloud storage. Cloud-cost-quota-enforcer 210 may compare the total cost with the configured cloud budget for the cloud. In one embodiment, cloud-cost-quota-enforcer 210 may apply a plurality of rules. Cloud-cost-quota-enforcer 210 may generate a first alert indicative of the cloud resource is going to be exhausted when the total consumption is within a predetermined percent of the configured resource. For example, if total cost is within 75-90% of cloud budget, cloud-cost-quota-enforcer 210 may raise the first alert and allow operation.

In one embodiment, applying the plurality of rules may also include performing one or more processes, including a garbage collection (GC) process. Applying the plurality of rules may further include transitioning from a first cloud operational state to a second cloud operation state when the total consumption is more than a predetermined percent of the configured resource and generating a second alert indicative of the cloud resource is almost exhausted. The second cloud operation state indicates the cloud storage is going to be suspended. For example, if total cost is more than 90% of cloud budget, cloud-cost-quota-enforcer 210 may trigger "TO-BE-SUSPENDED" state for cloud storage. Cloud-cost-quota-enforcer 210 may execute processes configured for "TO-BE-SUSPENDED" state, if any. Cloud-cost-quota-enforcer 210 may trigger "SUSPENDED STATE".

Backup server 206 may also include cloud-price-fetcher 216. Cloud-price-fetcher 216 may trigger Price List APIs for each configured cloud provider (e.g., 220). Cloud-price-fetcher 216 may also periodically fetch prices for storage, access, or retrieval.

Backup server 206 may further include cloud-ops-metrics module 218. Cloud-ops-metrics module 218 may collect metrics for cloud operations in each configured cloud storage such as read, write, overwrite, head, delete, list, batch requests, and/or retrievals.

Considering auto-tiering due to Automatic Lifecycle polices or Intelligent S3 tiers. If the backup application uses intelligent tiers or S3 with automatic lifecycle configuration policies to move data from one tier to another after a certain duration, the first set of charges may be for the first tier only and the data would move to the next tier only after the duration completes (e.g., only after 30 days). The administrator can ensure that the auto tier movement duration and the cloud budget duration are the same.

The backup server may also include cost-trend-analyzer module 214. The cost-trend-analyzer module 214 may fetch the cloud storage level cost details for all the past durations. For each duration and for each cloud storage, the cost-trend-analyzer module may fetch the Backup level costs. Only the last written cost for each duration can be fetched. The last written cost for each duration can be stored in appropriate in-mem data structure lists in the format of:

| Cloud Storage1 -> Backup1 | -> Duration1 : Cost |
| | -> Duration2 : Cost |
| | -> Duration3 : Cost |
| | ... |
| Cloud Storage1 -> Backup2 | -> Duration1 : Cost |
| | -> Duration2 : Cost |
| | -> Duration3 : Cost |
| | ... |

In this manner, an insight into whether any of the backups have started moving more data to cloud and hence have become costlier over time may be provided. The backups may need additional budget to be configured or reduce the amount or frequency of such backups. The backups may require to change the access patterns. etc.

Figure 3:
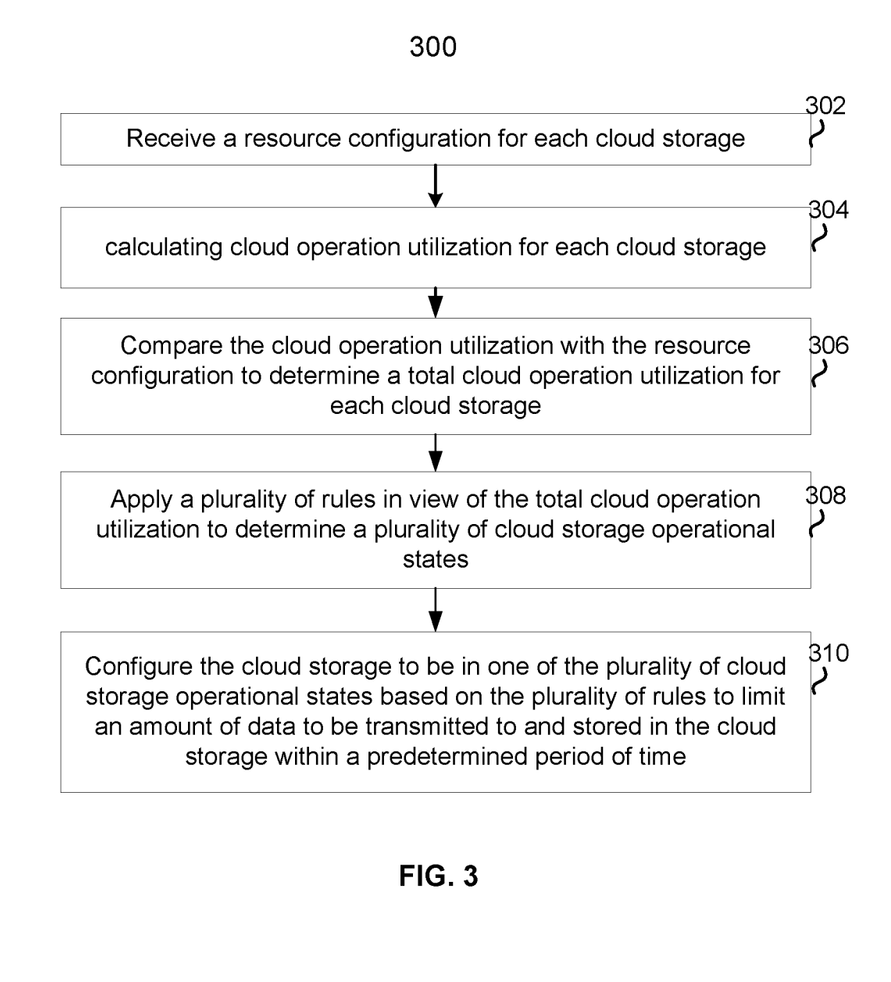
FIG. 3 is a flow diagram illustrating a method for managing backup resource on a cloud for a plurality of backup servers according to one embodiment.

FIG. 3 is a flow diagram illustrating method 300 for managing backup resource on a cloud for a plurality of backup servers according to one embodiment. For example, method 300 can be performed by a plurality of modules in a backup server 106, which can be implemented in software, firmware, hardware, or any combination thereof. Method 300 will now be discussed with reference to FIG. 1.

Referring now to FIG. 3, at block 302, backup server 106 may receive a resource configuration for each cloud storage. The resource configuration may include allocated cloud resource amount and duration.

At block 304, backup server 106 may calculate cloud operation utilization for each cloud storage.

At block 306, backup server 106 may compare the cloud operation utilization with the resource configuration to determine a total cloud operation utilization for each cloud storage.

At block 308, backup server 106 may apply a plurality of rules in view of the total cloud operation utilization to determine a plurality of cloud storage operational states.

At block 310, backup server 106 may configure the cloud storage to be in one of the plurality of cloud storage operational states based on the plurality of rules to limit an amount of data to be transmitted to and stored in the cloud storage within a predetermined period of time.

Figure 4A:
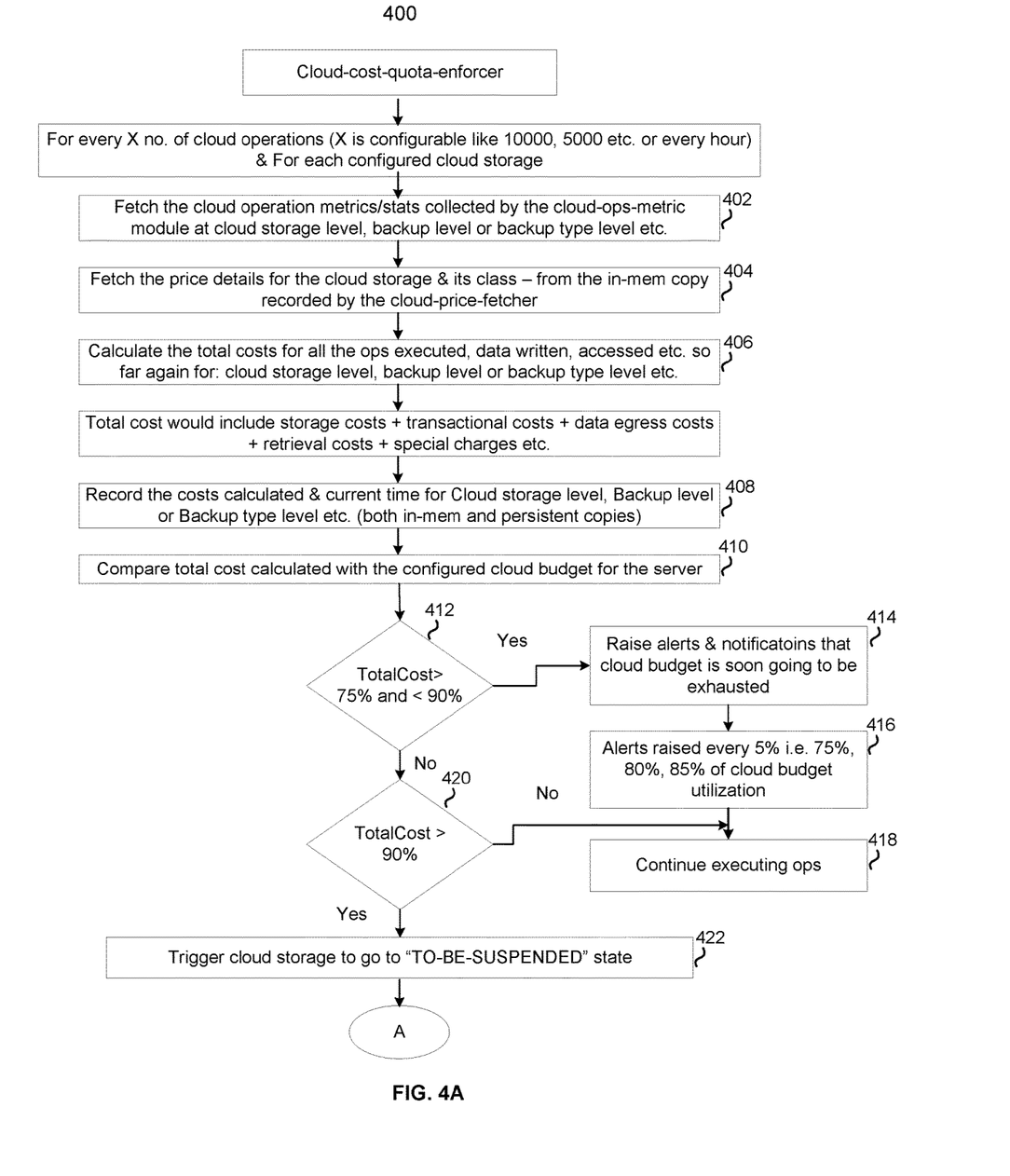
FIGS. 4A-4B are flow diagrams illustrating a method implemented by cloud-cost-quota enforcer according to one embodiment.

FIG. 4A is a flow diagram illustrating method 400 that can be performed by cloud-cost-quota-enforcer 110 according to one embodiment. Method 400 will now be discussed with reference to Figure.

In one embodiment, cloud-cost-quota-enforcer 110 may fetch cloud operation usage data representing statistics of each cloud operation performed in the backup server for a plurality of cloud hierarchy levels. For example, at block 402, for every x number of cloud operations (e.g., configurable for every 1000 operations or 10000 operations), cloud-cost-quota-enforcer 110 may fetch the cloud operation statistics collected by the cloud-ops-metrics module 118. In another embodiment, cloud-cost-quota-enforcer 110 may fetch the cloud operation statistics collected by the cloud-ops-metrics module 118, for example, every 1 or 4 hours.

In some embodiments, cloud-cost-quota-enforcer 110 may fetch resource data and cloud storage classes for each of the cloud storage. For example, at block 404, cloud-cost-quota-enforcer 110 may fetch the cloud storage price details updated by the cloud-price-fetcher 116 and then calculate the cost for the storage, cloud transactions, special operations, and for all the accumulated cloud operation types. The cost may be calculated based on the applicable slabs (e.g., 100-500 GB—$0.023 etc., 500 GB-1 TB—$0.019 etc.). For costs related to data movement, the calculated cost may include storage cost for how much data in GBs are moved for 1 month. For transactions, the calculated cost may be per the slab, for example, $0.0014 per 10000 requests, etc. For special operations, such as, batch jobs, a one-time charge plus a group charge for a number of operations within the batch jobs (e.g., $0.0001 for 1 Million operations in the batch job) may apply.

In one embodiment, cloud-cost-quota-enforcer 110 may calculate the cloud operation utilization in view of the cloud operation usage data, resource data, and cloud storage classes. At block 406, cloud-cost-quota-enforcer 110 may calculate the total cost for above described calculated costs.

Cloud-cost-quota-enforcer 110 may record the cloud operation utilization for the plurality cloud hierarchy levels in a local storage. For example, at block 408, cloud-cost-quota-enforcer 110 may also write this calculated cost and the current time into persistent disk (can be used later for any kind of cost trend analysis). The calculated cost and the current time may be stored for every "duration", so that the backup server can display the cost trend over time if needed. At block 410, cloud-cost-quota-enforcer 110 may compare the total cost with the configured cloud budget for the cloud. Cloud-cost-quota-enforcer 110 may also determine if the total accumulated cost is still within the configured cloud budget for the backup system or not. Cloud-cost-quota-enforcer 110 may calculate the costs accumulated at the levels at which the ops metrics are stored (e.g., backup level or backup type level, etc.) Cloud-cost-quota-enforcer 110 may write the backup info, the cost for it, and the time to disk persistently.

At block 412, it is determined if the calculated cost is between "75% to 90%" of the allowed calculated cost. At block 414, if the calculated cost is determined to be between "75% to 90%" of the allowed or configured cloud budget, the cloud-cost-quota-enforcer 110 may generate notifications and alerts in the backup server to notify the administrator that the cloud budget is soon going to be exhausted and the cloud storage may soon go to the suspended mode. The administrator can then add additional budget to the backup server. At block 416, these notifications and alerts may be generated for every 5% increase (i.e., at 75%, 80%, 85%, if the budget is not modified or increased). At block 418, after the last raised alert percentage (i.e., 85%) has been recorded, cloud operations may continue to be executed.

At block 420, it is determined if the calculated cost is more than 90% of the allowed or configured cloud budget. At block 422, if the calculated cost is determined to be more than 90% of the allowed or configured cloud budget, the cloud-cost-quota-enforcer 110 may trigger the cloud storage to be in the "TO-BE-SUSPENDED" state.

Figure 4B:
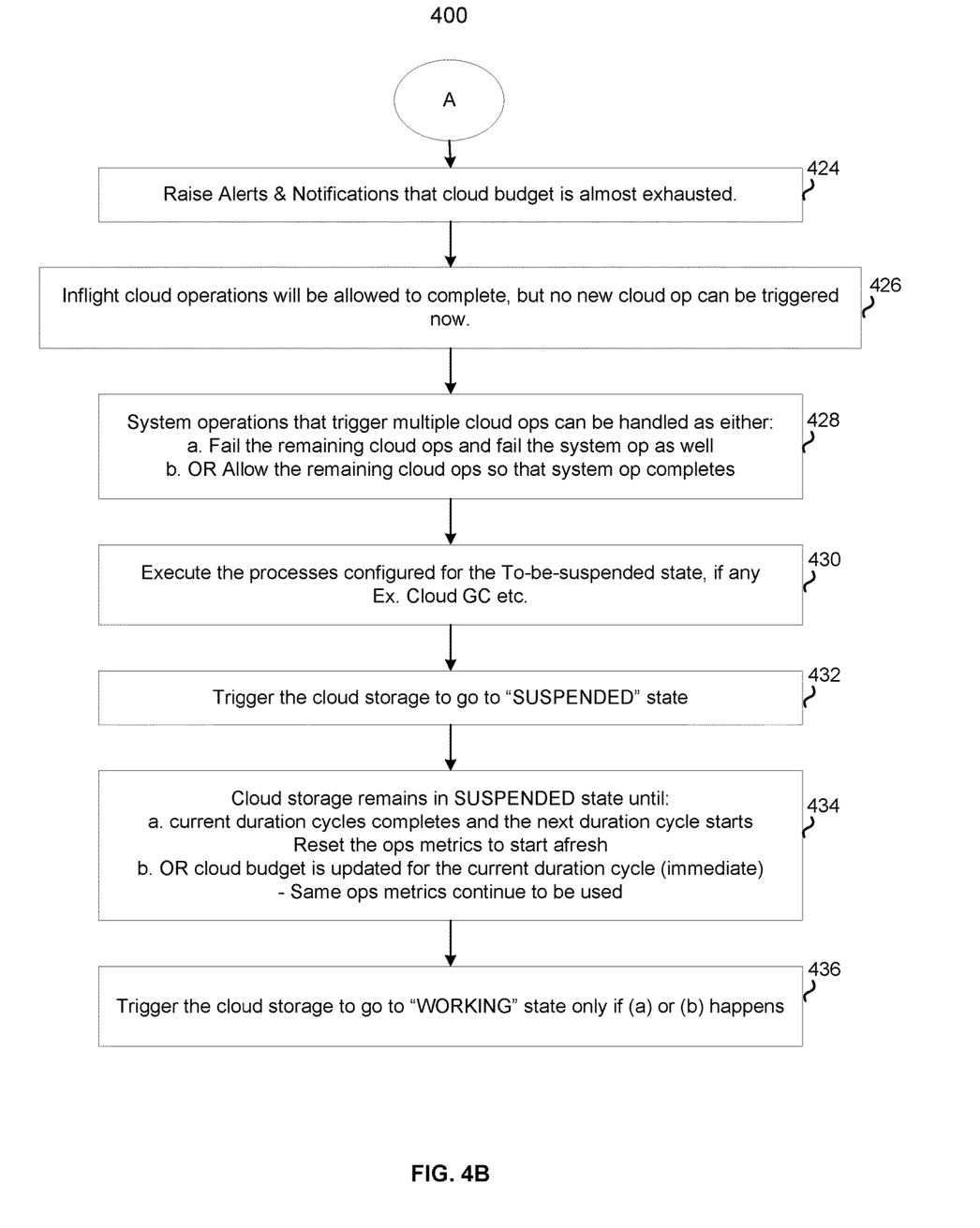

Now referring to FIG. 4B, at block 424, similar notifications and alerts would be generated and raised in the backup server. At block 426, cloud operations (inflight) that are already triggered may be allowed to complete. However, no new cloud operations may be allowed to be initiated in "TO-BE-SUSPENDED" state. At block 428, some system operations in the backup system may trigger multiple cloud requests. In one embodiment, all the remaining cloud operations may be blocked and thereby fail the system operation itself. Note that all the blocked remaining cloud operations can be resumed or redone once the budget is available again after some days. In another embodiment, all the remaining cloud operations may be allowed so that the system operation successfully completes. No additional new system operations may be triggered in the "TO-BE-SUSPENDED/SUSPENDED" state.

At block 430, once the "TO-BE-SUSPENDED" state is triggered for a cloud storage unit, and if cloud Garbage Collector (GC) is configured to be executed, then GC will be triggered now. In "TO-BE-SUSPENDED" state, other modules or processes may be executed instead of GC or after GC. Note that these can be configured by the users. The goal of the TO-BE-SUSPENDED state is to allow cleanup oriented processes to reduce the costs. At block 432, and once GC and other configured processes configured are completely executed, or if nothing is configured, cloud storage unit is triggered to go to the "SUSPENDED STATE.

In one embodiment, the cloud storage remains in the suspended state until a current duration cycle completes and a next duration cycle starts. For example, at block 434, the cloud storage may remain in the SUSPENDED state until the current duration cycles completes and the next duration cycle starts with the new available budget. Accounting ops data structure may be reset. Then, the cloud storage operational-state may be in "WORKING" state again.

In another embodiment, the cloud storage remains in the suspended state until a cloud budget is updated for a current duration cycle. The cloud storage may remain in the SUSPENDED state until if the cloud budget is updated for the current duration cycle (immediate). Same accounting ops may continue to be used.

At block 436, cloud storage operational-state may be in "WORKING" state. And once the operational-state changes from SUSPENDED to WORKING, the system operations may then resume or restart their operations.

Figure 5:
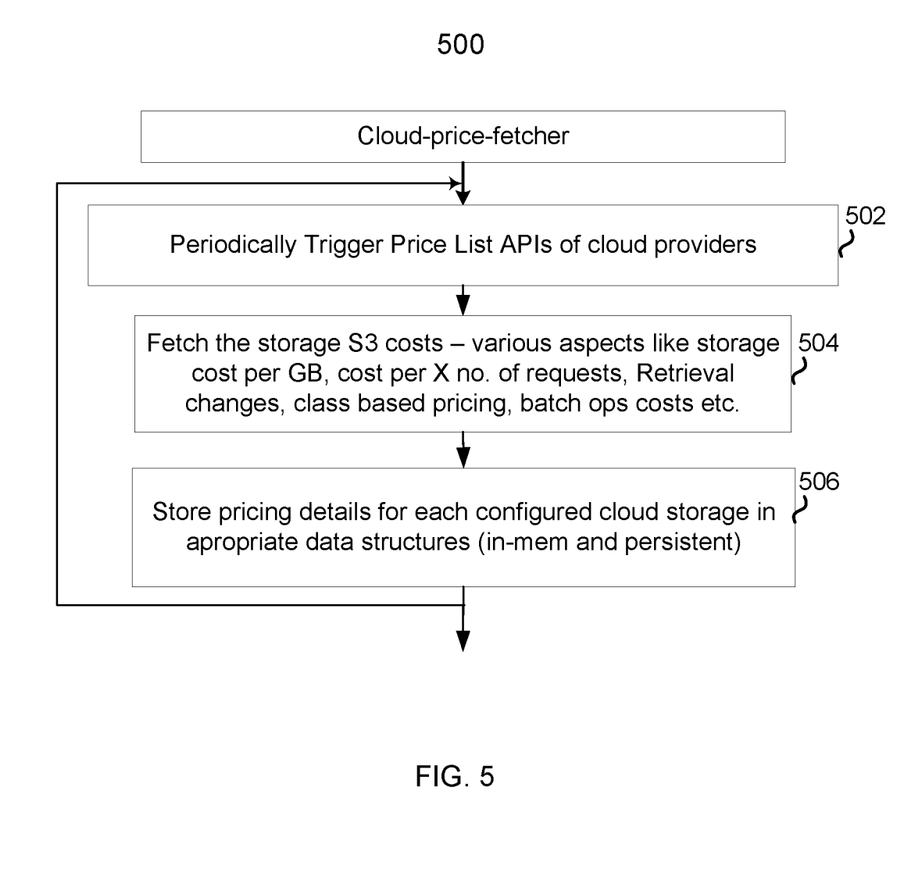
FIG. 5 is a flow diagram illustrating a method implemented by cloud-price-fetcher according to one embodiment.

FIG. 5 depicts an example of a process 500 that can be implemented by a cloud-price-fetcher module according to an embodiment. Each cloud provider publishes a pricing catalogue in various forms such as REST APIs. For example, AWS Price List Service API, GCP Cloud Billing Catalog API, or Azure Retail Rates Prices API. Some cloud providers may have a Billing API that may provide the billing accumulated for a duration of time. The billing is generally done for the entire user account in the cloud provider and numerous cloud buckets may be present under the same user account because multiple backup servers may be using the same cloud account.

Referring to FIG. 5, at block 502, cloud-price-fetcher may periodically (configurable in number of days) trigger these APIs for each configured cloud storage provider in the backup server. At block 504, cloud-price-fetcher may fetch the pricing range of S3 storage including $ price/Gigabyte (GB) for different slabs (e.g., <100 GB, 100-500 GB, 500-1 TB, etc.), different tiers (e.g., hot or cold storage, archival, standard storage, etc.), etc. The cloud providers may modify the price catalogue sometimes. Therefore, the number of days can be configured to once or twice in a month. At block 506, the pricing details may be locally stored in appropriate data structures in-mem as well as written persistently and overwritten when the next update occurs. Other modules may utilize this locally stored pricing information and may avoid accessing the cloud providers all the times to obtain the pricing information.

Figure 6:
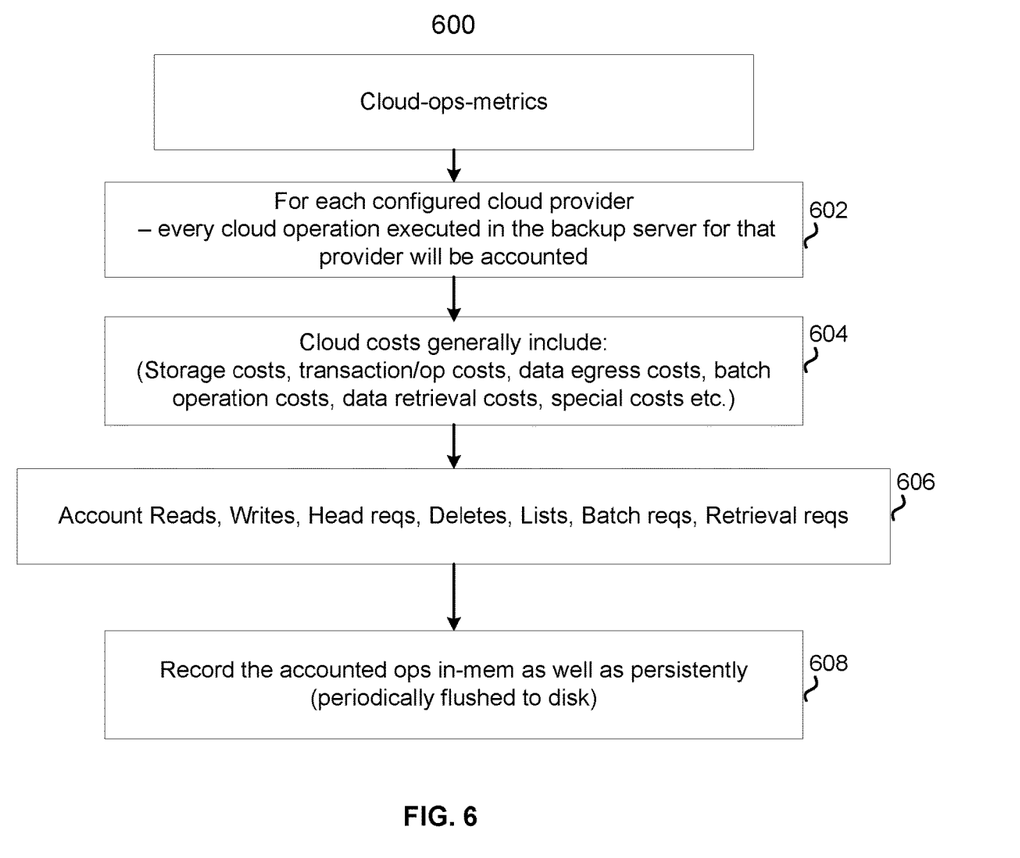
FIG. 6 is a flow diagram illustrating a method implemented by cloud-ops-metrics according to one embodiment.

FIG. 6 illustrates an example of a process 600 that can be implemented by a cloud-ops-metrics module according to an embodiment. Method 600 will now be discussed with reference to FIG. 1.

Referring to FIG. 6, at block 602, every cloud operation triggered in the backup server may be accounted by cloud-ops-metrics module 118. Cloud-ops-metrics module 118 can be implemented in an I/O path or a cloud layer of the backup server. The metrics for the cloud operations may be stored in appropriate data structures in the backup server, both in-memory as well as persisted to disk periodically (e.g., every 15 minutes). The metrics for the cloud operations may be categorized for each cloud provider configured in the backup server. At block 604, cloud costs may be a combination of various costs including storage costs, transaction/op costs, data egress costs, batch operation costs, etc.

At block 606, for each cloud provider, the operations may be categorized into groups and stored. Below are examples of the groupings.

Read requests: No. of GET, Total bytes Read
Write requests: No. of PUT, Total bytes Written
Head requests: No. of HEAD requests
Delete requests: No. of DELETE requests
List requests: No. of requests
Batch requests: Providers charge per job and per million ops
Retrieval requests: Applicable when reading from archival classes Data egress costs Any other categories of operation as applicable to the cloud storage and the backup server may also be accounted as well.

The accounting ops may maintain the operation metrics at cloud storage level. Additionally, the accounting ops may maintain the operation metric at every backup level using the same cloud storage (the sum of all metrics for all backups is equal to the metrics for the cloud storage). The backup level may include backup type or backup jobs, backups defined by placement tags or any similar backups that may be supported by the backup server. For example, these may be useful to detect deviations in cost at backup level and then identify particular backups that become costlier over time. These particular backups may require additional budget or control in terms of backup frequency, what gets backed up, etc.

These metrics may be maintained for a duration equal to the configured cloud-budget-duration. For example, if a cloud-budget-duration is configured as 1 month, the metrics may keep on accumulating for 1 month. New metrics for a new month may start from 0 (both in-mem and on-disk). At block 608, the persistent copy may be periodically written to an on-disk (in a regular file or a database or any type of persistent media within the backup server). Once a new duration starts, the persistent copies of previous durations may never get modified. Only the current duration copy may get updated. This ensures that the backup server can reload the accumulated accounting metrics to the in-mem copy from the disk in case of crashes, etc. Therefore, the metrics of all durations can be accessed by any module in the backup server for cost trend analysis, for example.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, or flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods described above are in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of managing backup resource for a backup server utilizing one or more cloud storages, the method comprising:
for each cloud storage of the one or more cloud storages,
configuring metadata to identify a plurality of cloud storage operational states for a cloud storage based on a total cloud operation utilization percentage of the cloud storage;
receiving a resource configuration for the cloud storage, the resource configuration including allocated cloud resource amount and duration for the cloud storage;

calculating cloud operation utilization for cloud operations for the cloud storage;
comparing the cloud operation utilization with the resource configuration to determine the total cloud operation utilization percentage for the cloud storage;
applying a plurality of rules in view of the total cloud operation utilization percentage;
determining the cloud storage to be in one of the plurality of cloud storage operational states based on the plurality of rules; and
limiting an amount of data to be transmitted to and stored in the cloud storage within a predetermined period of time based on the one of the plurality of cloud storage operational states.

2. The method of claim 1, further comprising:
fetching cloud operation usage data representing statistics of each cloud operation performed in the backup server for a plurality of cloud hierarchy levels;
fetching resource data and cloud storage classes for each cloud storage;
calculating the cloud operation utilization for cloud operations for each cloud storage in view of the cloud operation usage data, the resource data, and the cloud storage classes; and
recording the cloud operation utilization for the plurality cloud hierarchy levels in a local storage.

3. The method of claim 1, wherein applying the plurality of rules comprises:
generating a first alert indicative of a cloud resource of the cloud storage is going to be exhausted in response to the total cloud operation utilization percentage is between a first predetermined percentage threshold and a second predetermined percentage threshold.

4. The method of claim 3, wherein applying the plurality of rules comprises:
performing one or more processes, including a garbage collection (GC) process;
transitioning from a first cloud operational state to a second cloud operation state in response to the total cloud operation utilization percentage is more than the second predetermined percentage threshold, wherein the second cloud operation state indicates the cloud storage is going to be suspended; and
generating a second alert indicative of the cloud storage is going to be suspended.

5. The method of claim 1,
wherein the metadata represents the plurality of cloud storage operational states including a working state, a to-be-suspended state, and a suspended state.

6. The method of claim 5, wherein the determining the cloud storage to be in one of the plurality of cloud storage operational states comprises:
determining the cloud storage to be in the suspended state until a current duration cycle completes and a next duration cycle starts.

7. The method of claim 5, wherein the determining the cloud storage to be in one of the plurality of cloud storage operational states comprises:
determining the cloud storage to be in the suspended state until a cloud budget is updated for a current duration cycle.

8. A non-transitory machine-readable medium having instructions stored therein, which when executed by a processor, cause the processor to perform operations of managing backup resource for a backup server utilizing one or more cloud storages, the operations comprising:
for each cloud storage of the one or more cloud storages,
configuring metadata to identify a plurality of cloud storage operational states for a cloud storage based on a total cloud operation utilization percentage of the cloud storage;
receiving a resource configuration for the cloud storage, the resource configuration including allocated cloud resource amount and duration for the cloud storage;
calculating cloud operation utilization for cloud operations for the cloud storage;
comparing the cloud operation utilization with the resource configuration to determine the total cloud operation utilization percentage for the cloud storage;
applying a plurality of rules in view of the total cloud operation utilization percentage;
determining the cloud storage to be in one of the plurality of cloud storage operational states based on the plurality of rules; and
limiting an amount of data to be transmitted to and stored in the cloud storage within a predetermined period of time based on the one of the plurality of cloud storage operational states.

9. The machine-readable medium of claim 8, wherein the operations further comprise:
fetching cloud operation usage data representing statistics of each cloud operation performed in the backup server for a plurality of cloud hierarchy levels;
fetching resource data and cloud storage classes for each cloud storage;
calculating the cloud operation utilization for cloud operations for each cloud storage in view of the cloud operation usage data, the resource data, and the cloud storage classes; and
recording the cloud operation utilization for the plurality cloud hierarchy levels in a local storage.

10. The machine-readable medium of claim 8, wherein the applying the plurality of rules comprises:
generating a first alert indicative of a cloud resource of the cloud storage is going to be exhausted in response to the total cloud operation utilization percentage is between a first predetermined percentage threshold and a second predetermined percentage threshold.

11. The machine-readable medium of claim 10, wherein the applying the plurality of rules comprises:
performing one or more processes, including a garbage collection (GC) process;
transitioning from a first cloud operational state to a second cloud operation state in response to the total cloud operation utilization percentage is more than the second predetermined percentage threshold, wherein the second cloud operation state indicates the cloud storage is going to be suspended; and
generating a second alert indicative of the cloud storage is going to be suspended.

12. The machine-readable medium of claim 8,
wherein the metadata represents the plurality of cloud storage operational states including a working state, a to-be-suspended state, and a suspended state.

13. The machine-readable medium of claim 12, wherein the determining the cloud storage to be in one of the plurality of cloud storage operational states comprises:
determining the cloud storage to be in the suspended state until a current duration cycle completes and a next duration cycle starts.

14. The machine-readable medium of claim 12,
wherein the determining the cloud storage to be in one of the plurality of cloud storage operational states comprises:
  determining the cloud storage to be in the suspended state until a cloud budget is updated for a current duration cycle.

15. A data processing system, comprising:
a processor; and
a memory to store instructions, which when executed by the processor, cause the processor to perform operations of managing backup resource for a backup server utilizing one or more cloud storages, the operations including:
for each cloud storage of the one or more cloud storages,
  configuring metadata to identify a plurality of cloud storage operational states for a cloud storage based on a total cloud operation utilization percentage of the cloud storage;
  receiving a resource configuration for the cloud storage, the resource configuration including allocated cloud resource amount and duration for the cloud storage;
  calculating cloud operation utilization for cloud operations for the cloud storage;
  comparing the cloud operation utilization with the resource configuration to determine the total cloud operation utilization percentage for the cloud storage;
  applying a plurality of rules in view of the total cloud operation utilization;
  determining the cloud storage to be in one of the plurality of cloud storage operational states based on the plurality of rules; and
  limiting an amount of data to be transmitted to and stored in the cloud storage within a predetermined period of time based on the one of the plurality of cloud storage operational states.

16. The data processing system of claim 15, wherein the operations further comprise:
  fetching cloud operation usage data representing statistics of each cloud operation performed in the backup server for a plurality of cloud hierarchy levels;
  fetching resource data and cloud storage classes for each cloud storage;
  calculating the cloud operation utilization the cloud operations for each cloud storage in view of the cloud operation usage data, the resource data, and the cloud storage classes; and
  recording the cloud operation utilization for the plurality cloud hierarchy levels in a local storage.

17. The data processing system of claim 15, wherein the applying the plurality of rules comprises:
  generating a first alert indicative of a cloud resource of the cloud storage is going to be exhausted in response to the total cloud operation utilization percentage is between a first predetermined percentage threshold and a second predetermined percentage threshold.

18. The data processing system of claim 17, wherein the applying the plurality of rules comprises:
  performing one or more processes, including a garbage collection (GC) process;
  transitioning from a first cloud operational state to a second cloud operation state in response to the total cloud operation utilization percentage is more than the second predetermined percentage threshold, wherein the second cloud operation state indicates the cloud storage is going to be suspended; and
  generating a second alert indicative of the cloud storage is going to be suspended.

19. The data processing system of claim 15,
wherein the metadata represents the plurality of cloud storage operational states including working state, to-be-suspended state, and suspended state.

20. The data processing system of claim 19, wherein the determining the cloud storage to be in one of the plurality of cloud storage operational states comprises:
  determining the cloud storage to be in the suspended state until a current duration cycle completes and a next duration cycle starts.

* * * * *